(12) United States Patent
Zhou

(10) Patent No.: US 11,281,570 B2
(45) Date of Patent: Mar. 22, 2022

(54) SOFTWARE TESTING METHOD, SYSTEM, APPARATUS, DEVICE MEDIUM, AND COMPUTER PROGRAM PRODUCT

(71) Applicant: BOE TECHNOLOGY GROUP CO., LTD., Beijing (CN)

(72) Inventor: Suying Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/979,570

(22) PCT Filed: Dec. 26, 2019

(86) PCT No.: PCT/CN2019/128612
§ 371 (c)(1),
(2) Date: Sep. 10, 2020

(87) PCT Pub. No.: WO2020/140820
PCT Pub. Date: Jul. 9, 2020

(65) Prior Publication Data
US 2021/0011840 A1    Jan. 14, 2021

(30) Foreign Application Priority Data

Jan. 3, 2019    (CN) .......................... 201910005305.4

(51) Int. Cl.
*G06F 11/36* (2006.01)
*G06F 8/41* (2018.01)
*G06F 8/60* (2018.01)

(52) U.S. Cl.
CPC ............ *G06F 11/3688* (2013.01); *G06F 8/41* (2013.01); *G06F 8/60* (2013.01); *G06F 11/368* (2013.01); *G06F 11/3684* (2013.01)

(58) Field of Classification Search
CPC ............... G06F 11/3676; G06F 11/368; G06F 11/3684; G06F 11/3688; G06F 8/41; G06F 8/60
See application file for complete search history.

(56) References Cited

U.S. PATENT DOCUMENTS

| 2012/0089964 | A1  | 4/2012 | Sawano |
| 2020/0019493 | A1* | 1/2020 | Ramakrishna ...... G06F 11/3688 |
| 2021/0011840 | A1  | 1/2021 | Zhou |

FOREIGN PATENT DOCUMENTS

| CN | 102799508 A | 11/2012 |
| CN | 103425584 A | 12/2013 |

(Continued)

OTHER PUBLICATIONS

Translated CN107608873 (Year: 2016).*

(Continued)

*Primary Examiner* — Hanh Thi-Minh Bui
(74) *Attorney, Agent, or Firm* — Scully Scott Murphy & Presser

(57) ABSTRACT

The present disclosure provides a software testing method, system, apparatus, device, medium, and computer program product. The method includes: acquiring, by an automated compilation and deployment platform, a first source code and first code information corresponding to the first source code; compiling and deploying, by the automated compilation and deployment platform, the first source code to obtain first deployment information of the first source code; creating a test-version software according to the first deployment information, and determining a first test case corresponding to the first code information according to a preset correspondence between code information and test cases; performing, by an automated testing platform, a functional test for the test-version software based on the first test case to obtain a test result. In the embodiments of the present disclosure, the correspondence between code information and test cases may be established in advance and preset.

8 Claims, 8 Drawing Sheets

(56) References Cited

FOREIGN PATENT DOCUMENTS

| | | |
|---|---|---|
| CN | 103530225 A | 1/2014 |
| CN | 104834593 A | 8/2015 |
| CN | 105446878 A | 3/2016 |
| CN | 106874205 A | 6/2017 |
| CN | 107239292 A | 10/2017 |
| CN | 107423214 A | 12/2017 |
| CN | 107608873 A | 1/2018 |
| CN | 109726132 A | 5/2019 |
| JP | 2013-228970 A | 11/2013 |

OTHER PUBLICATIONS

Translated CN106874205 (Year: 2017).*
M. Wurster, U. Breitenbücher, O. Kopp and F. Leymann, "Modeling and Automated Execution of Application Deployment Tests," 2018 IEEE 22nd International Enterprise Distributed Object Computing Conference (EDOC), 2018, pp. 171-180, doi: 10.1109/EDOC.2018.00030. (Year: 2018).*
First Office Action dated Apr. 21, 2020 received in Chinese Patent Application No. CN 201910005305.4 together with an English language translation.
Second Office Action dated Oct. 23, 2020 received in Chinese Patent Application No. CN 201910005305.4 together with an English language translation.

* cited by examiner

US 11,281,570 B2

SOFTWARE TESTING METHOD, SYSTEM, APPARATUS, DEVICE MEDIUM, AND COMPUTER PROGRAM PRODUCT

This application is a national phase entry of PCT International Application No. PCT/CN2019/128612, filed on Dec. 26, 2019, which claims priority to Chinese Patent Application No. 201910005305.4 filed on Jan. 3, 2019. The entire disclosure of each of PCT International Application No. PCT/CN2019/128612 and Chinese Patent Application No. 201910005305.4 is incorporated herein by reference as a part of this application.

TECHNICAL FIELD

The present disclosure relates to a field of testing technology, and in particular to a software testing method, system, apparatus, device, medium, and computer program product.

BACKGROUND

Software testing (or program testing) is a process of verifying correctness, completeness, safety, and quality of the software by comparing a difference between actual output and expected output. Usually, this process includes operating the software under specified service conditions, to determine whether the software meets design requirements. Thus, the quality of the software is evaluated.

At present, a prevailing method of software testing is to manually perform functional tests and record test results. However, in the entire testing process, key functions of the tests need to be determined manually, so it is greatly affected by human factors. Especially, inexperienced testers often find it difficult to accurately determine a test scope. This will lead to blind spots in the testing of software functions, thus reducing the comprehensiveness of functional testing.

SUMMARY OF THE DISCLOSURE

According to an aspect of the disclosure, there is provided a software testing method, comprising: acquiring, by an automated compilation and deployment platform, a first source code and first code information corresponding to the first source code; compiling and deploying, by the automated compilation and deployment platform, the first source code to obtain first deployment information of the first source code; creating a test-version software according to the first deployment information, and determining a first test case corresponding to the first code information according to a correspondence between code information and test cases; performing, by an automated testing platform, a functional test for the test-version software based on the first test case to obtain a test result.

According to some embodiments of the present disclosure, the method further comprises: creating a test task corresponding to the test-version software according to the first test case; transferring the test task to the automated testing platform via an automated testing platform interface, wherein the performing, by the automated testing platform, a functional test for the test-version software based on the first test case to obtain a test result including: determining, by the automated testing platform, a first test script corresponding to the first test case based on the received test task; performing, by the automated testing platform, the functional test for the test-version software based on the first test script, to obtain the test result.

According to some embodiments of the present disclosure, the method further comprises: generating vulnerability information if the test result indicates that the test fails; obtaining a second source code based on the vulnerability information, wherein the second source code is compiled and deployed by the automated compilation and deployment platform, to obtain second deployment information of the second source code.

According to some embodiments of the present disclosure, the compiling and deploying, by the automated compilation and deployment platform, the first source code to obtain first deployment information of the first source code includes: compiling, by the automated compilation and deployment platform, the first source code to obtain a first executable code; deploying, by the automated compilation and deployment platform, the first executable code to a testing device to obtain the first deployment information.

According to some embodiments of the present disclosure, the method further comprises: recording a testing process data; generating a testing process statistical report based on the testing process data, wherein the testing process data includes at least one of test result data, vulnerability information data, and test case usage data.

According to another aspect of the present disclosure, there is provided a software testing system, comprising: a first obtaining unit configured to obtain a first source code and first code information corresponding to the first source code via an automated compilation and deployment platform; a compiling and deploying unit configured to compile and deploy the first source code via the automated compilation and deployment platform, to obtain first deployment information of the first source code; an automated software testing management unit configured to create a test-version software according to the first deployment information, and determine a first test case corresponding to the first code information according to a correspondence between code information and test cases; a testing unit configured to perform a functional test for the test-version software via an automated testing platform based on the first test case to obtain a test result.

According to some embodiments of the present disclosure, the automated software testing management unit includes: a first creating subunit configured to create a test task corresponding to the test-version software according to the first test case; a transferring subunit configured to transfer the test task to the automated testing platform via an automated testing platform interface, the testing unit includes: a determining subunit configured to determine a first test script corresponding to the first test case via the automated testing platform based on the received test task; a testing subunit configured to perform the functional test for the test-version software via the automated testing platform based on the first test script, to obtain the test result.

According to some embodiments of the present disclosure, the system further comprises: a first generating unit configured to generate vulnerability information if the test result indicates that the test fails; a second obtaining unit configured to obtain a second source code based on the vulnerability information to compile and deploy the second source code by the automated compilation and deployment platform, to obtain second deployment information of the second source code.

According to some embodiments of the present disclosure, the compiling and deploying unit includes: a compiling subunit configured to compile the first source code via the automated compilation and deployment platform to obtain a first executable code; a deploying subunit configured to deploy the first executable code to a testing device via the automated compilation and deployment platform to obtain the first deployment information.

According to some embodiments of the present disclosure, the system further comprises: a recording unit configured to record a testing process data; a second generating unit configured to generate a testing process statistical report based on the testing process data, wherein the testing process data includes at least one of the following: test result data, vulnerability information data, and test case usage data.

According to another aspect of the present disclosure, there is provided a software testing apparatus, comprising an automated compilation and deployment platform, an automated software testing management system and an automated testing platform, the automated software testing management system being configured with an automated compilation and deployment platform interface and an automated testing platform interface, the automated software testing management system calling and exchanging data with the automated compilation and deployment platform via the automated compilation and deployment platform interface, the automated software testing management system calling and exchanging data with the automated testing platform via the automated testing platform interface, wherein the automated compilation and deployment platform is configured to obtain a first source code and first code information corresponding to the first source code, compile the first source code to obtain a first executable code, and deploy the first executable code to a testing device via the automated compilation and deployment interface to obtain the first deployment information of the first source code; the automated software testing management system is configured to determine a first test case corresponding to the first code information according to a preset correspondence between code information and test cases, and obtain a test-version software of the first source code according to the first deployment information; the automated testing platform is configured to perform a functional test for the test-version software based on the first test case to obtain a test result.

According to some embodiments of the present disclosure, the automated software testing management system is further configured to: create a test task corresponding to the test-version software according to the first test case; transfer the test task to the automated testing platform via the automated testing platform interface, the automated testing platform is configured to: determine a first test script corresponding to the first test case based on the received test task; perform the functional test for the test-version software based on the first test script to obtain the test result.

According to some embodiments of the present disclosure, the automated software testing management system is further configured to: receive the test result from the automated testing platform via the automated testing platform interface; generate vulnerability information if the test result indicates that the test fails; obtain a second source code based on the vulnerability information, the automated compilation and deployment platform is further configured to compile and deploy the second source code; the automated software testing management system is configured to determine a second test case corresponding to the second code information according to the preset correspondence between code information and test cases, and obtain a test-version software of the second source code according to the second deployment information.

According to yet another aspect of the present disclosure, there is provided a device for software testing, comprising: a processor; and a memory, wherein the memory has a computer-readable code stored therein, and when the computer-readable code is run by the processor, the software testing method described above.

According to yet another aspect of the present disclosure, there is also provided a computer-readable storage medium having instructions stored thereon, which, when executed by a processor, cause the processor to execute the software testing method described above.

According to yet another aspect of the present disclosure, there is also provided a computer program product, which, when executed on a computer, causes the computer to execute one or more steps of the software testing method described above.

DESCRIPTION OF THE EMBODIMENTS

In order to make the above objectives, features, and advantages of the present disclosure more obvious, the present disclosure will be further described in detail below in conjunction with the accompanying drawings and specific embodiments.

The present disclosure provides a software testing method and an automated software testing management system, to solve the problem of low comprehensiveness of functional tests due to the existence of blind spots in the testing of software functions, which is caused by improper manual selection of test cases by inexperienced testers.

Figure 1:
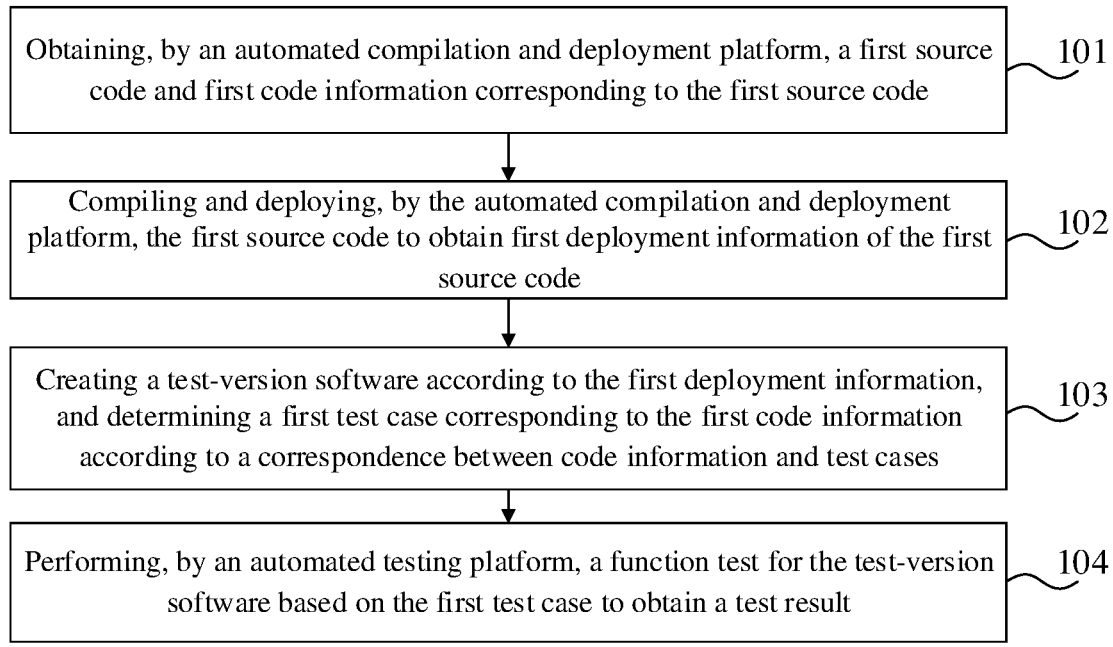
FIG. 1 shows a flowchart of steps of a software testing method according to an embodiment of the present disclosure.

FIG. 1 shows a flowchart of steps of a software testing method according to an embodiment of the present disclosure. The method includes the following steps.

At step 101, a first source code and first code information corresponding to the first source code are obtained by an automated compilation and deployment platform.

In an embodiment of the present disclosure, the automated compilation and deployment platform may be configured to automatically compile and deploy source code uploaded by a software developer. First, according to the required feature of the software, the software developer can write the first source code that addresses that require function. And then the software developer may upload the first source code to the automated compilation and deployment platform, and upload first code information corresponding to the first source code as a code identifier of the first source code. The automated compilation and deployment platform may be configured to obtain the first source code and its corresponding first code information. In a specific application, the first code information can be a piece of digital code, or description information on the required feature solved by the first source code, etc., which is not specifically limited in the embodiments of the present disclosure.

At step 102: the first source code is compiled and deployed by the automated compilation and deployment platform, to obtain first deployment information of the first source code.

After obtaining the first source code and its corresponding first code information, the automated compilation and deployment platform may be configured to compile the first source code firstly, and then deploy compiled executable code, so as to obtain the first deployment information.

At step 103, a test-version software is created according to the first deployment information, and a first test case corresponding to the first code information is determined according to a correspondence between code information and test cases.

In an embodiment of the present disclosure, the correspondence between code information and test cases may be preset to realize an automatic association between source codes and test cases. Thus, a test case required for testing can be automatically determined according to code information corresponding to uploaded source code. After obtaining the test-version software, the first test case corresponding to the first code information may be retrieved with the preset correspondence between code information and test cases. That is, which test cases are required for functional tests of the test-version software may be determined. Besides, in practical applications, one or more test cases may also be required for testing certain functions of the software. Therefore, the amount of the one or more first test cases is not specifically limited in the embodiments of the present disclosure.

As an example, in practical applications, the correspondence between code information and test cases may be established by experienced senior test engineers, so that a test case corresponding to source code may be automatically selected according to the correspondence each time an automated test is performed, thereby preventing improper manual selection of test cases by inexperienced testers, avoiding blind spots in the testing of software functions, and improving the comprehensiveness of functional tests.

As shown in FIG. 1, at step 104, a functional test is performed for the test-version software by an automated testing platform based on the first test case, so as to obtain a test result.

In an embodiment of the present disclosure, a first test script corresponding to the first test case may be determined by the automated testing platform, and then a functional test (such as a traditional functional test, a new functional test, etc.) for the test-version software is performed by the first test script, to obtain the test result. The test result may include, for example, at least one of the following information: which test case passes the test, which required feature corresponds to the passed test case, which test case fails the test, and which required feature corresponds to the failed test case, and the like.

In the software testing method according to the embodiment of the present disclosure, the first source code and its corresponding first code information may be obtained via the automated compilation and deployment platform. Then the first source code may be compiled and deployed by the automated compilation and deployment platform to obtain the first deployment information, and the test-version software may be created according to the first deployment information. Then, the first test case corresponding to the first code information may be determined according to the preset correspondence between code information and test cases. And then a functional test may be performed for the test-version software by the automated testing platform based on the first test case, to obtain the test result. In the embodiment of the present disclosure, the correspondence between code information and test cases may be established in advance and preset, so that a test case corresponding to the source code may be automatically selected according to the correspondence each time an automated test is performed, thereby preventing improper manual selection of test cases by inexperienced testers, avoiding blind spots in the testing of software functions, and improving the comprehensiveness of functional tests.

According to an embodiment of the present disclosure, the compiling and deploying the first source code by the automated compilation and deployment platform to obtain the first deployment information of the first source code includes: compiling the first source code by the automated compilation and deployment platform to obtain a first executable code; deploying the first executable code to a testing device by the automated compilation and deployment platform to obtain the first deployment information.

Figure 2:
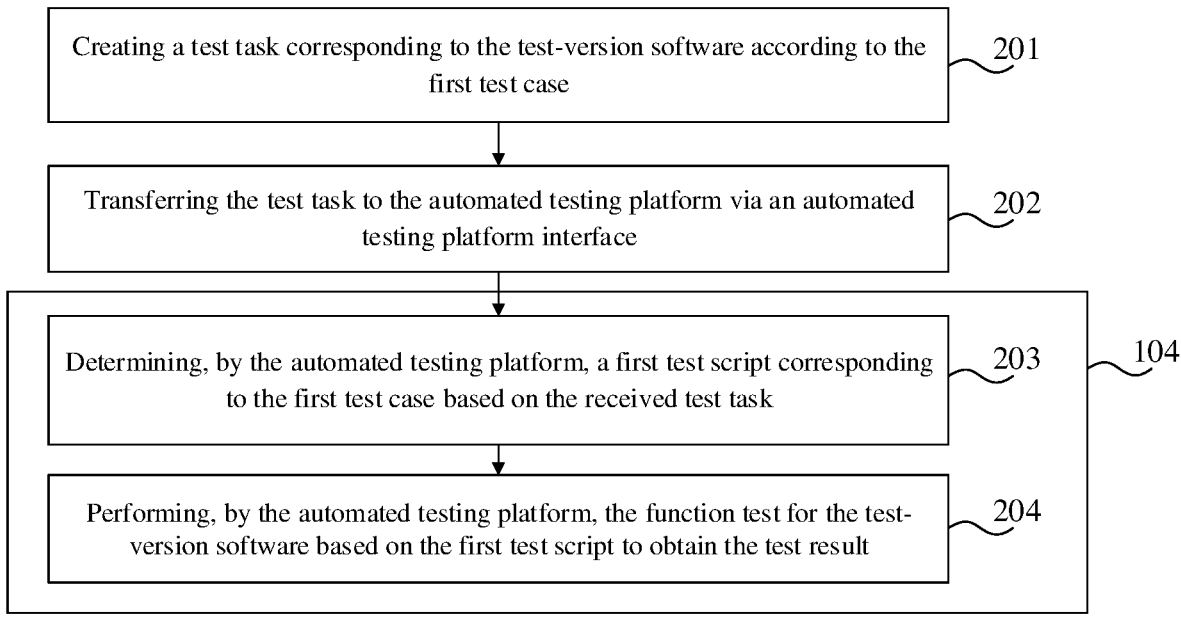
FIG. 2 shows another flowchart of steps of the software testing method according to an embodiment of the present disclosure.

FIG. 2 shows another flowchart of steps of the software testing method according to an embodiment of the present disclosure. The software testing method according to the present disclosure may further include the following steps.

At step 201, a test task corresponding to the test-version software is created according to a first test case. And at step 202, the test task is transferred to the automated testing platform via an automated testing platform interface.

As shown in FIG. 2, in the software testing method according to the present disclosure, the step 104 may include the following step 203 and step 204.

At step 203, a first test script corresponding to the first test case is determined by the automated testing platform based on the received test task.

At step 204, a functional test is performed for the test-version software by the automated testing platform based on the first test script to obtain the test result.

According to an embodiment of the present disclosure, the software testing method may further include: generating vulnerability information when the test result indicates that the test fails; obtaining a second source code based on the vulnerability information; compiling and deploying the second source code by the automated compilation and deployment platform, to obtain second deployment information of the second source code.

According to an embodiment of the present disclosure, the software testing method may further include recording a testing process data; generating a testing process statistical report based on the testing process data, wherein the testing process data includes at least one of test result data, vulnerability information data, and test case usage data.

As an applicable example, the software testing method provided by the present disclosure may be executed by an automated software testing management system. Besides, it is also required to build an automated compilation and deployment platform and an automated testing platform. The automated compilation and deployment platform is configured to integrate a code management library and automated compilation and deployment tools, manage submitted source code, automatically compiles the source code, and complete a deployment-to-software test environment automatically. The automated testing platform is configured to integrate and encapsulate test tools such as functional automation tools, interface automation tools, and the like. Thus, an association with the automated software testing management system and automatic execution of tests is realized. Test results are feedback to the automated software testing management system. The automated software testing management system is equipped with an automated compilation and deployment platform interface and an automated testing platform interface. The automated compilation and deployment platform may be invoked by the automated software testing management system via the automated compilation and deployment platform interface, and then data is exchanged therebetween via this interface. Likewise, the automated testing platform may be invoked by the automated software testing management system via the automated testing platform interface, and then data is exchanged therebetween via this interface.

Figure 3:
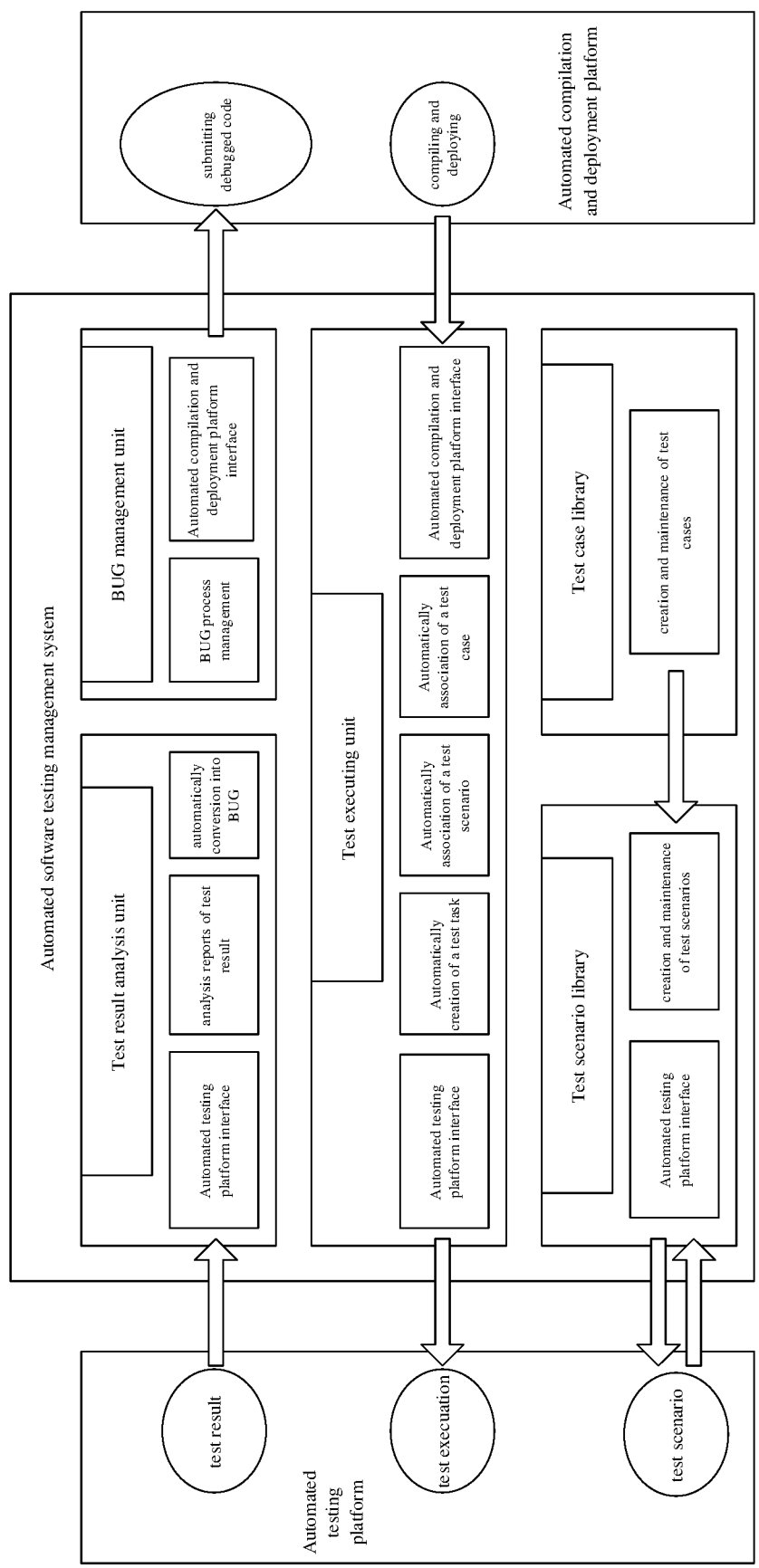
FIG. 3 shows a schematic application diagram of an automated software testing management system, an automated compilation and deployment platform, and an automated testing platform according to an embodiment of the present disclosure.

FIG. 3 shows a schematic application diagram of an automated software testing management system, an automated compilation and deployment platform, and an automated testing platform according to an embodiment of the present disclosure. Referring to FIG. 3, the automated software testing management system may include a test case library, a test scenario library, a test executing unit, a test result analyzing unit, and a BUG management unit. It should be noted that each of the aforementioned functional units is only one functional division provided by the embodiments of the present disclosure, which does not constitute a limitation to the present disclosure. The respective functional units are introduced in detail below.

A test scenario library may be used to collect and store test scenarios in the automated testing platform, to update the test scenarios, and to synchronize the test scenarios to the automated testing platform. Test scenarios refer to simulated usage scenarios that may occur during actual use of the software, for example, a scenario where the user enters identification information when using the software and then the software display the user's personal management interface, or a scenario where the software responds when it receives a certain instruction, and the like. As shown in FIG. 3, test scenarios stored in the automated testing platform may be synchronized to the test scenario library of the automated software testing management system via the automated testing platform interface for unified management. The test scenarios in the test scenario library may be modified and updated by the automated software testing management system, and the modified and updated test scenarios may be synchronized to the automated testing platform.

The test case library is used to create, store, and update test cases. Test cases may be written based on test scenarios. Test cases may represent inputs in a certain test scenario and the right outputs corresponding to the inputs. In specific applications, test cases need to be created in accordance with an association relationship between source codes, test cases, and test scenarios. A page for creating test cases may display constraint filling rules of test cases to achieve the purpose of standardizing test case design activities. In specific applications, maintenance of corresponding test cases and test scenarios may be completed in combination with a waterfall development model or an iterative development model.

The test execution unit can receive deployment information obtained by compiling and deploying the source code on the automated compilation and deployment platform via the automated compilation and deployment platform interface. The test execution unit may be configured to create a test-version software. Then the test execution unit may be configured to automatically create a test task after automatically associate the source code, test cases, and test scenarios, and issue the test task to the automated testing platform via the automated testing platform interface.

The test result analyzing unit can be used to collect a test result obtained after the automated testing platform executes a test. Then the test result analysis unit can be used to generate an analysis report based on the test results, and automatically convert the functions that failed the tests into vulnerability information, which is then delivered to the BUG management unit.

The BUG management unit may support vulnerability information management, and transfer a resolution status of the vulnerability information in the test-version software to the automated compilation and deployment platform. After the developers solve the vulnerability information (BUG), the automated compilation and deployment platform is configured to obtain a second source code after the BUG is solved, and then automatically compile and deploy the second source code, so as to enter a next iterative testing process. Thus, closed-loop automation of the testing process is achieved.

In practical applications, the automated compilation and deployment platform may be configured to firstly obtain a first source code that implements a certain required feature, and first code information corresponding to the first source code, that is, a code identifier of the first source code. The first source code is compiled and deployed by the automated compilation and deployment platform to obtain the first deployment information of the first source code. In an embodiment of the present disclosure, this step may specifically include: compiling the first source code by the automated compilation and deployment platform to obtain a first executable code, and deploying the first executable code to a preset testing device by the automated compilation and deployment platform to obtain the first deployment information.

Since source code is not executable, after obtaining the first source code, the automated compilation and deployment platform may be configured to automatically compile the first source code firstly to obtain the first executable code. And then the automated compilation and deployment platform may be configured to automatically deploy the executable code to a test environment of the software, that is, the preset testing device, so as to simulate an actual use environment of the software. In practical applications, the testing device may be a server, a firewall, and the like, which is not specifically limited by the embodiments of the present disclosure. After completing the automatic deployment, the automated compilation and deployment platform may be configured to obtain the first deployment information corresponding to the first source code. The first deployment information may specifically include information such as which required features have been completed, which updates have been made, and which bugs have been resolved by the first source code. The automated compilation and deployment platform may be configured to transfer the first deployment information to the automated software testing management system via the automated compilation and deployment platform interface, so that the automated software testing management system may automatically create the test-version software based on this requirement after receiving the first deployment information. Then, according to the preset correspondence between code information and test cases, the first test case corresponding to the first code information is determined.

Figure 4:
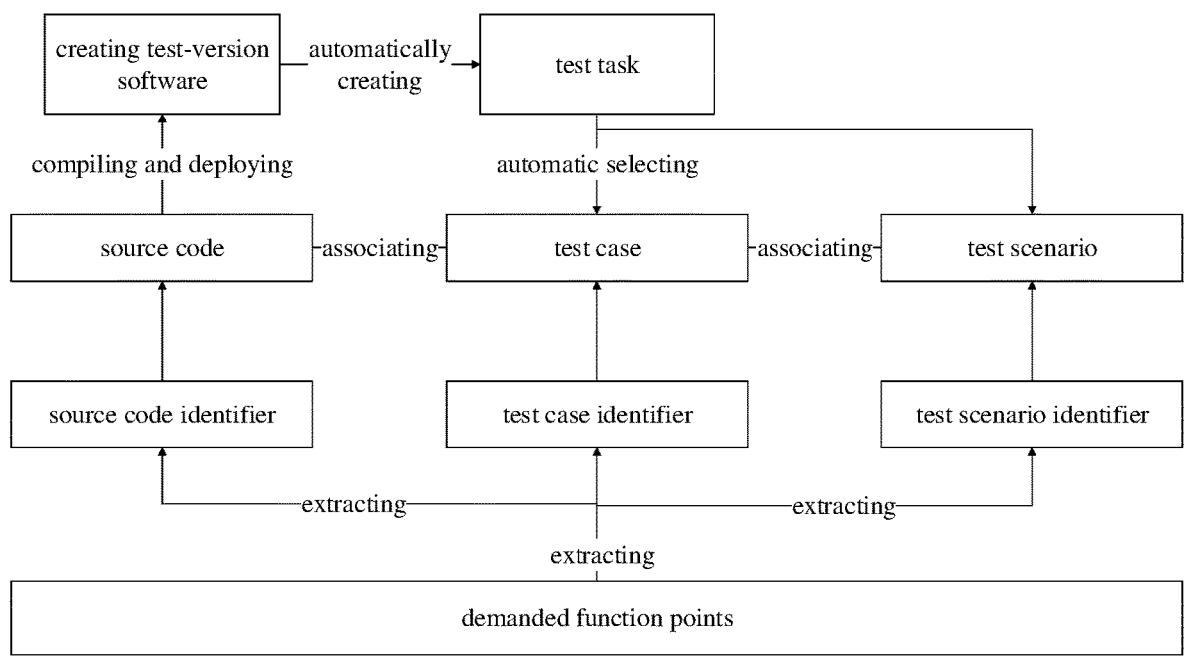
FIG. 4 shows a schematic diagram of correspondence between code information and test cases according to an embodiment of the present disclosure.

FIG. 4 shows a schematic diagram of the correspondence between code information and test cases in an embodiment of the present disclosure. Referring to FIG. 4, source codes, test cases, and test scenarios need to be developed and created based on the required features. That is to say, source code used to solve certain demands should be associated with a test scenario simulated for the demand, and a test case for testing whether the demand can be realized, where the required feature may be a feature in the minimum level of code or a minimum feature defined in micro-service granularity under a micro-service architecture.

As shown in FIG. 4, a first source code corresponding to a first source code identifier (such as the first code information) is compiled and deployed by the automated compilation and deployment platform, so as to obtain the first deployment information. In practical applications, an association relationship between any two of source codes, test cases, and test scenarios may be represented by a correspondence between any two of source code identifiers, test case identifiers, and test scenario identifiers. The automated software testing management system may set the correspondence between any two of source code identifiers, test case identifiers, and test scenario identifiers in advance, so that a corresponding source code identifier, test case identifier, and test scenario identifier may be extracted with a required feature as a bridge. Besides, the automated software testing management system may also create a test-version software based on the received first deployment information, and then automatically create a test task, so that the automated testing platform automatically selects a corresponding first test case for testing when it receives the test task.

For example, a source code A1 corresponds to a test case B1, and a test case B1 corresponds to a test scenario C1. Thus, when the first source code whose first code information is A1 is submitted to the automated compilation and deployment platform, the automated compilation and deployment platform may perform compilation and deployment to obtain the test-version software of the first source code. Then, the automated software testing management system may find the test case B1 and the test scenario C1 for version binding, and finally, perform a functional test for the test-version software based on the test case B1.

The correspondence between any of source codes, test cases, and test scenarios may be established by experienced senior test engineers, so that a test case corresponding to source code may be automatically selected according to the correspondence each time an automated test is performed, thereby preventing improper manual selection of test cases by inexperienced testers, avoiding blind spots in the testing of software functions and improving the comprehensiveness of functional tests.

Next, a test task corresponding to the test-version software is created according to the first test case.

Figure 5:
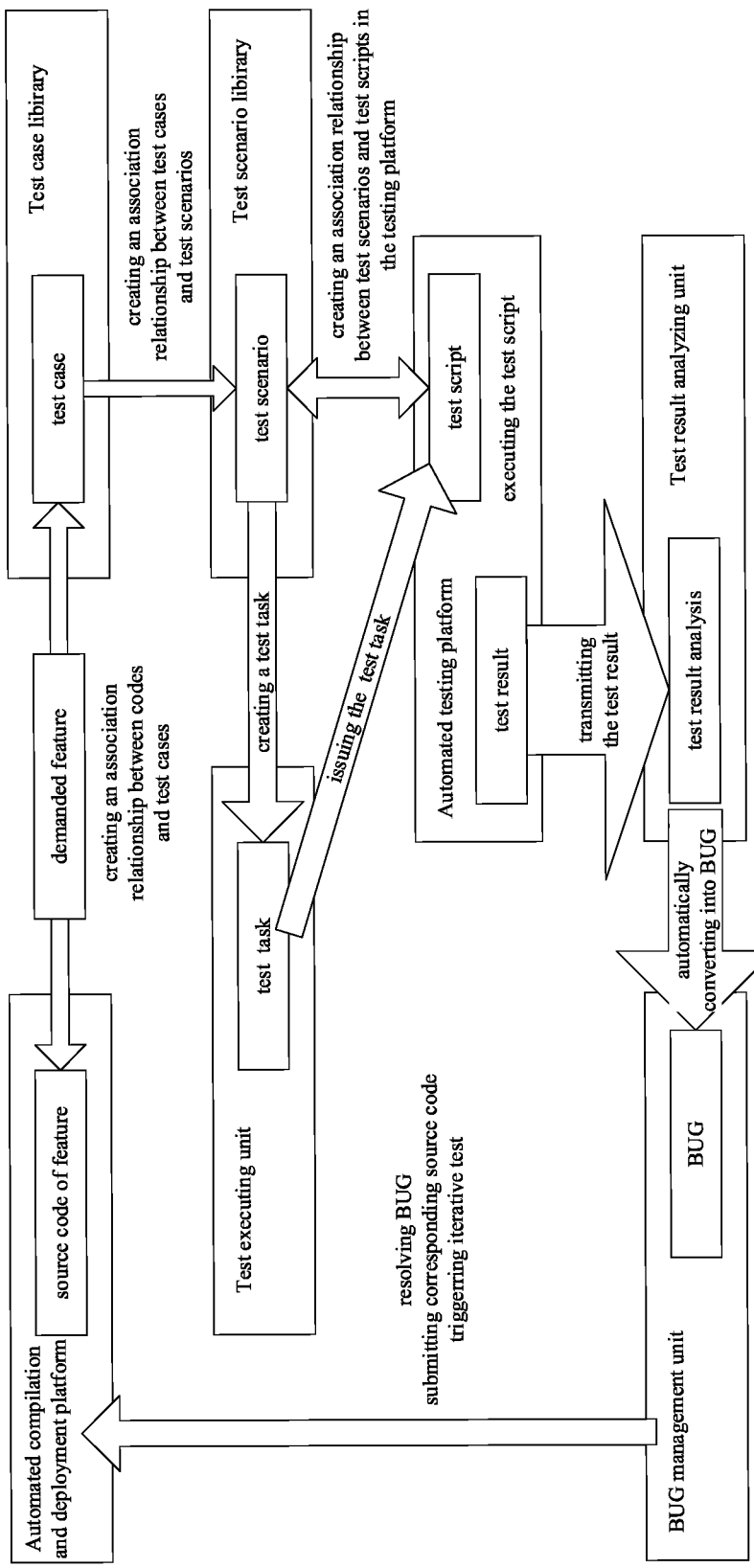
FIG. 5 shows a schematic diagram of interaction among functional units and platforms of the automated software testing management system during software testing according to an embodiment of the present disclosure.

FIG. 5 shows a schematic diagram of interaction among respective functional units and respective platforms in the automated software testing management system during software testing according to an embodiment of the present disclosure. Referring to FIG. 5, firstly, a first source code may be compiled and deployed by the automated compilation and deployment platform automatically to obtain the first deployment information of the first source code. Specifically, the first source code is compiled by the automated compilation and deployment platform to obtain a first executable code, and the first executable code is deployed to the testing device to obtain the first deployment information. Then, a test-version software is created by the automated software testing management system based on the first deployment information. A first test case and its associated test scenario corresponding to the first code information may be selected based on a required feature, and a test task corresponding to the test-version software is created. In practical applications, since the first test case itself cannot be directly used for software testing, it is necessary to write the first test case as an executable first test script in advance. And then testing with the first test script is executed. Therefore, the task may include use case information of the first test case, or script information of the first test script, etc., so that the corresponding first test script for testing may be selected by an automated testing platform according to the use case information or script information. In practical applications, the use case information may specifically be use case identifiers such as use case indexes, and the script information may specifically be script identifiers such as script indexes, which are not specifically limited by the embodiments of the present disclosure.

Next, the created test task is transferred to the preset automated testing platform via the automated testing platform interface.

Figure 6:
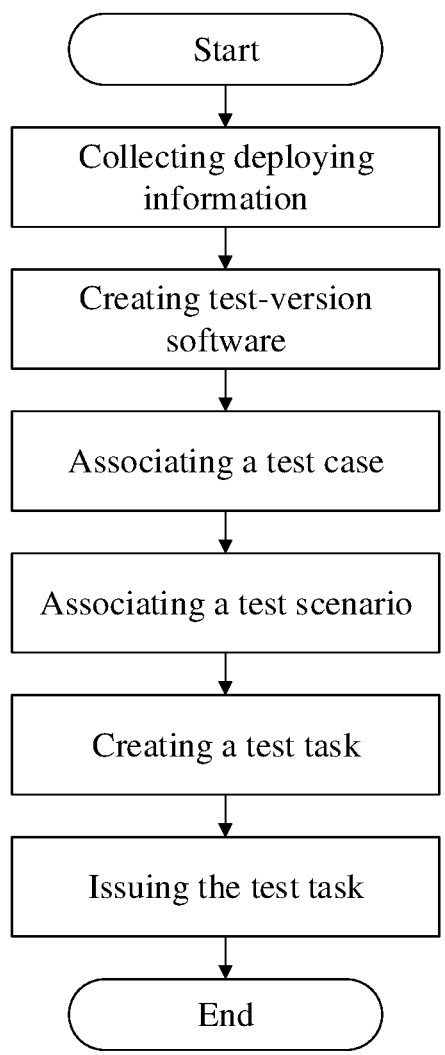
FIG. 6 shows a flowchart of a process of issuing a test task according to an embodiment of the present disclosure.

Referring to FIG. 5, after creating the test task, a test task may be issued from a test executing unit to the automated testing platform via the automated testing platform interface, so that a functional test for the test-version software is performed by the automated testing platform. A general flow of the above-mentioned automated software testing management system from collecting the first deployment information to issuing the test task may refer to the flowchart shown in FIG. 6, which is not repeatedly described herein.

Next, a first test script corresponding to the first test case may be determined by the automated testing platform based on the received test task.

As shown in FIG. 5, a test script corresponding to each test case may be preset in the automated testing platform. Thus, when a test task is received, a first test script corresponding to the first test case may be selected from a plurality of preset test scripts by the automated testing platform, according to use case information or script information of the test task.

Next, a functional test for the test-version software is performed by the automated testing platform with the first test script to obtain a test result.

After the first test script corresponding to the first test case is determined, the first test script may be executed in a test environment of the software by the automated testing platform, so that a functional test for the test-version software is performed to obtain a test result corresponding to the function. It should be noted that when the number of the first test case is greater than 1, a first test script corresponding to each first test case may be executed sequentially in the test environment of the software, and test results after the execution of the first test script may be obtained.

After the test result is obtained, the test result may be transferred from the automated testing platform to the test result analyzing unit of the automated software testing management system via the automated testing platform interface. The test result may be analyzed by the test result analyzing unit after the test result is received to determine if the execution of the first test script resulted in a correct output. If the correct output can be obtained after the execution of the first test script, it means that this functional test passes, and the testing of this required feature can be terminated by the automated software testing management system.

However, in an actual testing process, it is possible that some first test scripts cannot get correct outputs after execution, for reasons such as logic errors, usage scenarios inconsistent with the design, and the like existed in the test-version software, which indicates that these functional tests have failed.

According to an embodiment of the present disclosure, when the test result indicates that the test fails, vulnerability information is generated. As shown in FIG. 5, the first test case that fails the test may be converted into vulnerability information (BUG) by the test result analyzing unit, and the vulnerability information (BUG) can be transferred to a BUG management unit. The vulnerability information may be handled by developers. A resolution status of the vulnerability information may be monitored in real-time by the BUG management unit.

Next, a second source code, which is improved based on the vulnerability information, is obtained to perform the next round of iterative test, until all functional tests of the test-version software pass.

Figure 7:
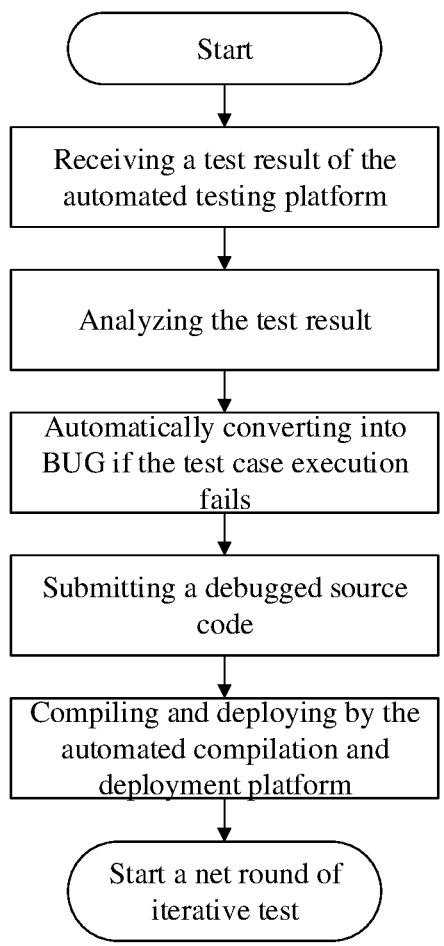
FIG. 7 shows a flowchart of a BUG management process according to an embodiment of the present disclosure.

After the vulnerability information is resolved, developers may submit the second source code improved based on the vulnerability information to the automated compilation and deployment platform. The automated software testing management system may be configured to transfer status information of the vulnerability information to the automated compilation and deployment platform, thereby triggering the automated compilation and deployment platform to automatically compile and deploy the second source code. Since there is an association between the vulnerability information and the source code, the integrity of the source code may be check by the automated compilation and deployment platform based on the association. The compilation and deployment of the source code may be completed after the source code is fully submitted. Then the second deployment information may be transferred to the test executing unit of the automated software testing management system. A test task is created by the test executing unit automatically and then issued to the automated testing platform for a new round of iterative tests. If the test for the second source code fails, vulnerability processing is continued and improved third source code is then submitted for another iterative test until all functional tests of the test-version software pass. Thus, an automated closed loop of the testing process is realized. A flow of the above-mentioned automated software testing management system from receiving the test result to starting a new round of iterative tests may refer to the flowchart shown in FIG. 7, which will not be repeatedly described herein.

In practical applications, inexperienced testers who do not have a thorough understanding of the testing process usually lead to inadequate test execution and waste a lot of time learning the testing process. By realizing the automated closed loop of the iterative testing process, low test efficiency caused by inadequate control of the testing process by naive testers may be avoided, thereby improving the test efficiency and reducing the time cost of manual testing.

Figure 8:
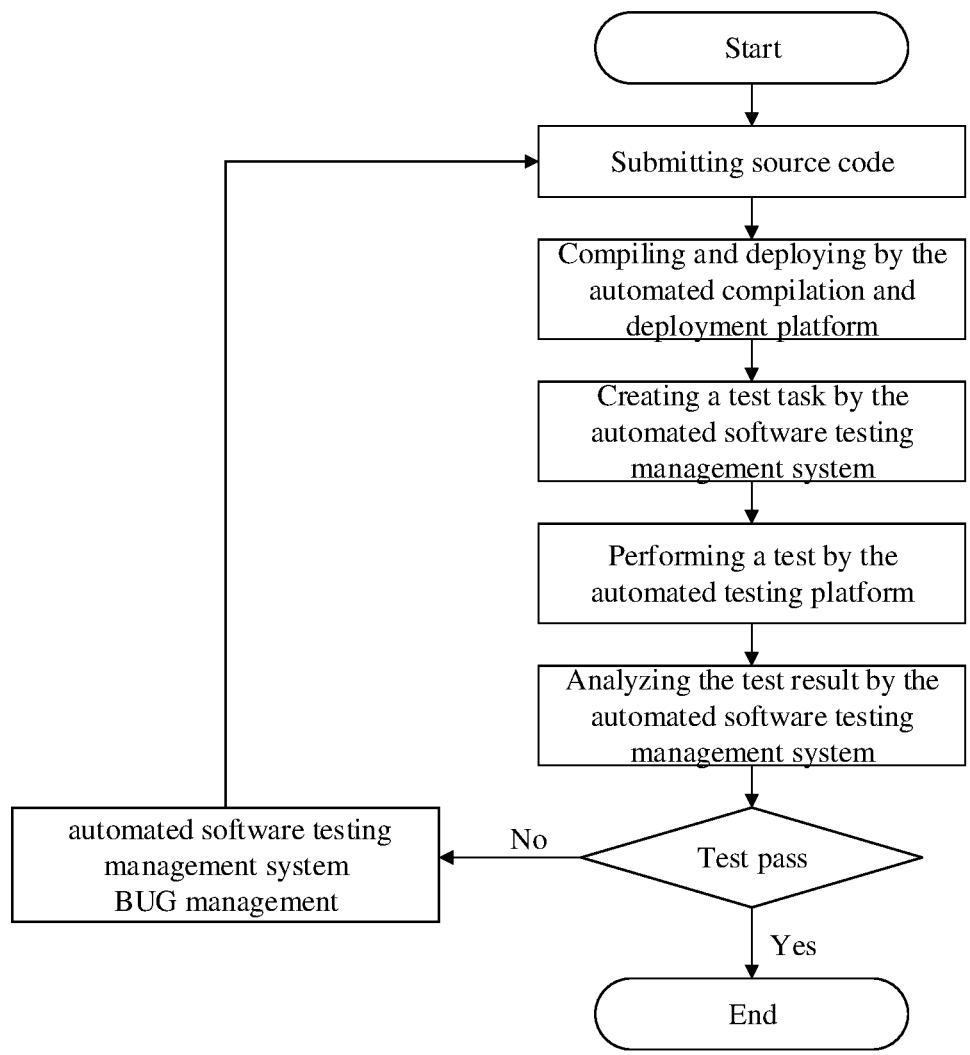
FIG. 8 shows an application flowchart of software testing according to an embodiment of the present disclosure.

FIG. 8 shows an application flowchart of software testing according to an embodiment of the present disclosure. Referring to FIG. 8, in the software testing method provided by the embodiments of the present disclosure, after the developers complete the writing and submitting of source code, the compilation and the deployment of the source code may be processed by the automated compilation and deployment platform to obtain the first deployment information of a first source code. The first deployment information may be delivered to the automated software testing management system via the automated compilation and deployment platform interface. Then, the automated software testing management system is triggered to create a test-version software based on the first deployment information. Also, a test task is created by the automated software testing management system and issued to the automated testing platform. A test script is executed by the automated testing platform. And a test result is feedback to the automated test management system after the completion of the test. If the test passes, testing for the function is terminated. And if the test fails, a BUG management unit is triggered to drive the developers to solve the BUG and submit improved source code, thereby triggering a next round of iterative tests until the test passes.

Further, in an embodiment of the present disclosure, the software testing method may further include: recording a testing process data; generating a testing process statistical report based on the testing process data; wherein the testing process data includes at least one of test result data, vulnerability information data, and test case usage data.

The testing process data, such as test result data, vulnerability information data, test case usage data, etc., may be recorded by the automated software testing management system during each iterative testing process of the entire testing process. Thus, information, such as a test result of each iterative test, what types of vulnerability information is generated in each iterative test, which test cases are used in each iterative test, and the like is obtained. Then the testing process data may be collected by the automated software testing management system and a testing process statistical report is generated. Thus reference for quality assessment and improvement of the automated software testing management system is provided.

In the embodiment of the present disclosure, the first source code and its corresponding first code information may be obtained by the automated compilation and deployment platform. Then the first source code is compiled and deployed by the automated compilation and deployment platform to obtain the first deployment information of the first source code. Then, the test-version software is created according to the first deployment information. The first test case corresponding to the first code information is determined according to the preset correspondence between code information and test cases. Then a functional test for the test-version software is executed by the automated testing platform based on the first test case, and a test result is obtained. If the test result indicates that the test fails, vulnerability information may be generated. Then the second source code, which is improved based on the vulnerability information, may be obtained for the next round of iterative tests. This process continues until all functional tests of the test-version software pass. Thus, an automated closed loop of the iterative testing process is realized. In the embodiment of the present disclosure, the correspondence between code information and test cases may be established in advance and preset, so that a test case corresponding to the source code may be automatically selected according to the correspondence each time an automated test is performed, thereby preventing improper manual selection of test cases by inexperienced testers, avoiding blind spots in the testing of software functions, and improving the comprehensiveness of functional tests. In addition, by realizing the automated closed loop of the iterative testing process, low test efficiency caused by inadequate control of the testing process by naive testers may be avoided, thereby improving the test efficiency and reducing the time cost of manual testing.

Figure 9:
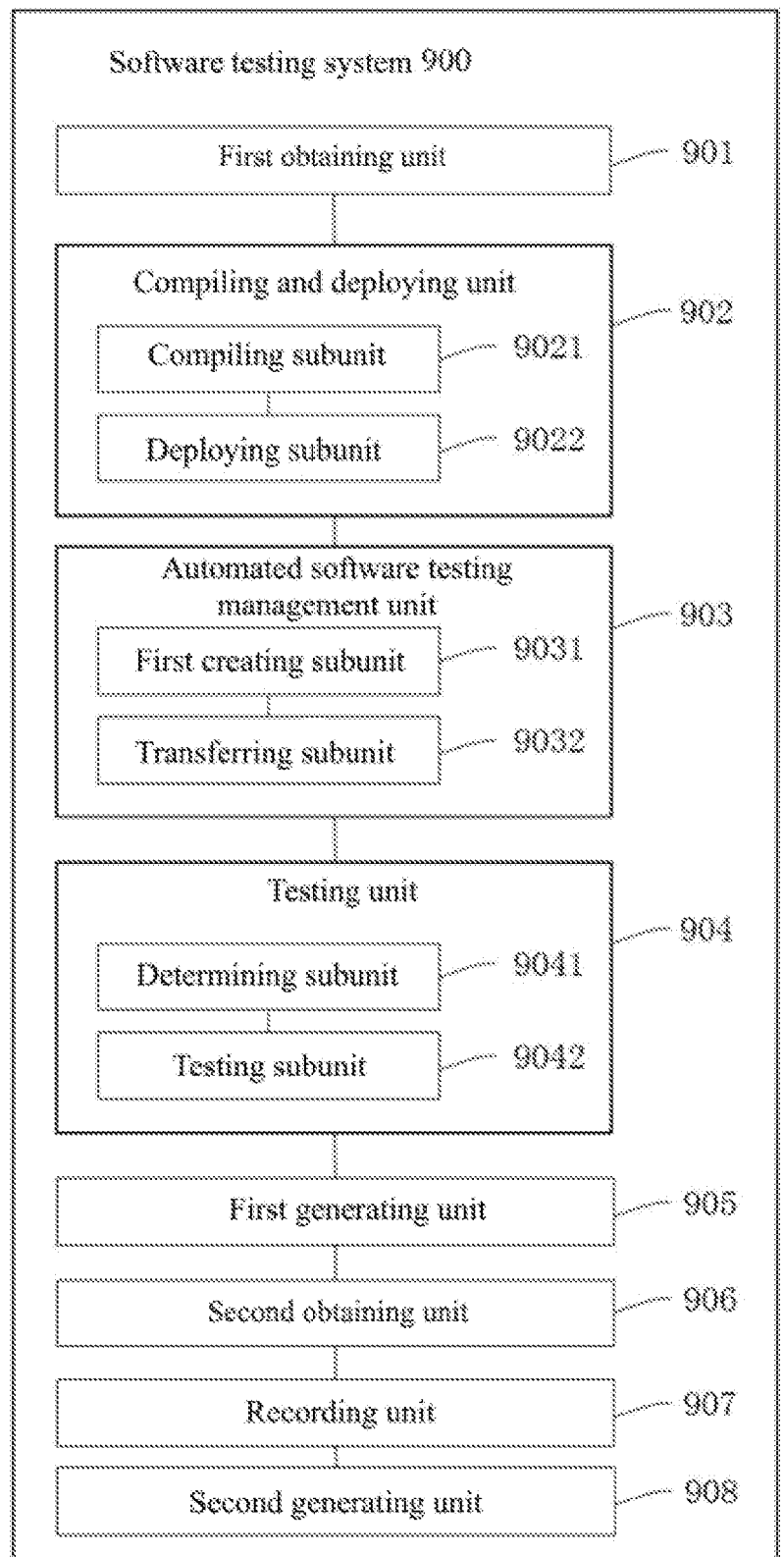
FIG. 9 shows a schematic structural diagram of a software testing system according to an embodiment of the present disclosure.

According to another aspect of the present disclosure, a software testing system is also provided. FIG. 9 shows a schematic structural diagram of a software testing system according to an embodiment of the present disclosure. Referring to FIG. 9, the software testing system 900 may include: a first obtaining unit 901, configured to obtain a first source code and first code information corresponding to the first source code via an automated compilation and deployment platform; a compiling and deploying unit 902, configured to compile and deploy the first source code by the automated compilation and deployment platform to obtain first deployment information of the first source code; an automated software testing management unit 903, configured to create a test-version software according to the first deployment information, and determine a first test case corresponding to the first code information according to a correspondence between code information and test cases; a testing unit 904, configured to perform a functional test for the test-version software via an automated testing platform based on the first test case to obtain a test result.

Optionally, referring to FIG. 9, the automated software testing management unit 903 includes a first creating subunit 9031, configured to create a test task according to the test-version software and the first test case; and a transferring subunit 9032, configured to transfer the test task to the automated testing platform via an automated testing platform interface.

The testing unit 904 includes a determining subunit 9041, configured to determine a first test script corresponding to the first test case via the automated testing platform based on the received test task; a testing subunit 9042, configured to perform the functional test for the test-version software via the automated testing platform based on the first test script, to obtain the test result.

Optionally, referring to FIG. 9, the system 900 further includes a first generating unit 905, configured to generate vulnerability information if the test result indicates that the test fails; a second obtaining unit 906, configured to obtain a second source code based on the vulnerability information, wherein the second source code is compiled and deployed by the automated compilation and deployment platform to obtain second deployment information of the second source code.

Optionally, referring to FIG. 9, the compiling and deploying unit 902 includes a compiling subunit 9021, configured to compile the first source code via the automated compilation and deployment platform to obtain a first executable code; a deploying subunit 9022, configured to deploy the first executable code to a testing device via the automated compilation and deployment platform to obtain the first deployment information.

Optionally, referring to FIG. 9, the system 900 further includes a recording unit 907, configured to record a testing process data; a second generating unit 908, configured to generate a testing process statistical report based on the testing process data, where the testing process data includes at least one of the following: test result data, vulnerability information data, and test case usage data. The testing device may be a device such as a server, a firewall, and the like.

In the embodiment of the present disclosure, the first source code and its corresponding first code information may be obtained by the first obtaining unit via the automated compilation and deployment platform. Then the first source code may be compiled and deployed by the compiling and deploying unit via the automated compilation and deployment platform to obtain the first deployment information of the first source code. Then, the test-version software may be created by the automated software testing management unit according to the first deployment information. The first test case corresponding to the first code information may be determined according to the preset correspondence between code information and test cases. Then, the functional test for the test-version software may be performed by the testing unit via the automated testing platform based on the first test case, to obtain the test result. In the embodiment of the present disclosure, the correspondence between code information and test cases may be established in advance and preset, so that a test case corresponding to the source code may be automatically selected according to the correspondence each time an automated test is performed, thereby preventing improper manual selection of test cases by inexperienced testers, avoiding blind spots in the testing of software functions, and improving the comprehensiveness of functional tests.

According to another aspect of the present disclosure, a software testing apparatus is also provided. The software testing device includes an automated compilation and deployment platform, an automated software testing management system, and an automated testing platform. The automated software testing management system is configured with an automated compilation and deployment platform interface and an automated testing platform interface. The automated software testing management system calls and exchanges data with the automated compilation and deployment platform via the automated compilation and deployment platform interface. The automated software testing management system calls and exchanges data with the automated testing platform via the automated testing platform interface.

The automated compilation and deployment platform is configured to obtain the first source code and first code information corresponding to the first source code, compile the first source code to obtain a first executable code, and deploy the first executable code to a testing device via the automated compilation and deployment interface to obtain the first deployment information of the first source code. The automated software testing management system is configured to determine a first test case corresponding to the first code information according to a preset correspondence between code information and test cases, and obtain a test-version software of the first source code according to the first deployment information. The automated testing platform is configured to perform a functional test for the test-version software based on the first test case to obtain a test result. According to the embodiment of the present disclosure, the automated compilation and deployment platform, the automated software testing management system, and the automated testing platform may be implemented as program codes for the above steps, or may be implemented as a hardware device that can run the above program codes to realize the above software testing device.

According to an embodiment of the present disclosure, the automated software testing management system may further be configured to: create a test task corresponding to the test-version software according to the first test case; and transfer the test task to the automated testing platform via the automated testing platform interface. The automated testing platform is configured to: determine a first test script corresponding to the first test case based on the received test task; perform the functional test for the test-version software based on the first test script to obtain the test result.

According to an embodiment of the present disclosure, the automated software testing management system is further configured to receive the test result from the automated testing platform via the automated testing platform interface; generate vulnerability information if the test result indicates that the test fails; obtain a second source code based on the vulnerability information, and the automated compilation and deployment platform is further configured to compile and deploy the second source code.

According to an embodiment of the present disclosure, the automated compilation and deployment platform is configured to: compile the first source code to obtain the first executable code; deploy the first executable code to the testing device to obtain the first deployment information. The testing device may be a device such as a server, firewall, and the like.

According to an embodiment of the present disclosure, the automated software testing management system is further configured to receive a testing process data; generate a testing process statistical report based on the testing process data; where the testing process data includes at least one of the following: test result data, vulnerability information data, and test case usage data.

According to another aspect of the present disclosure, there is also provided a device for software testing, including a processor; and a memory, where the memory has a computer-readable code stored therein, and when the computer-readable code is run by the processor, the software testing method described above is executed.

According to another aspect of the present disclosure, there is also provided a computer-readable storage medium having instructions stored thereon, which, when executed by a processor, cause the processor to execute the software testing method described above.

According to yet another aspect of the present disclosure, there is also provided a computer program product, which, when executed on a computer, causes the computer to execute one or more steps of the software testing method described above.

The foregoing method embodiments are all described as a series of action combinations for the sake of simplicity, but those skilled in the art should appreciate that the present disclosure is not limited by the described sequence of actions, because some of the steps may be carried out in other sequence or simultaneously according to the present disclosure. Besides, those skilled in the art should also appreciate that the embodiments described in the specification are all preferred embodiments, and the involved actions and units are not necessarily required by the present disclosure.

The respective embodiments in this specification are described in a progressive manner, and each embodiment focuses on describing differences from other embodiments, while the same or similar parts between the respective embodiments may be referred to each other.

At last, it should be noted that herein relational terms such as first and second are only used to distinguish one entity or operation from another entity or operation, and do not necessarily require or imply any such actual relationship or sequence among these entities or operations. Moreover, the terms "comprise" "include" or any other variants thereof are intended to cover non-exclusive inclusion, so that a process, method, commodity, or device that includes a series of elements includes not only those elements, but also other elements that are not explicitly listed, or also include elements inherent to this process, method, commodity or device. If there are no more restrictions, an element defined by the sentence "including a . . . " does not exclude the existence of other identical elements in the process, method, commodity, or device that includes the element.

The software testing method and the automated software testing management system provided by the present disclosure are described above in detail. Specific examples are used herein to illustrate the principles and implementations of the present disclosure, and the description of the above embodiments is only intended to help understand the methods and core ideas of the present disclosure; at the same time, for those of ordinary skill in the art, there will be variations in the specific implementations and the scope of the application according to the ideas of the present disclosure. In summary, the content of this specification should not be construed as a limitation of the present disclosure.

What is claimed is:

1. A software testing method, comprising:
   acquiring, by an automated compilation and deployment platform, a first source code of a software to be tested and first code information corresponding to the first source code, wherein the first code information is a first source code identifier;
   compiling and deploying, by the automated compilation and deployment platform, the first source code to obtain first deployment information of the first source code;
   creating a test-version software according to the first deployment information, and determining a first test case corresponding to the first code information according to a correspondence between code information and test cases, wherein source codes, test cases, and test scenarios are developed and created based on required features, a correspondence between any two of source codes, test cases, and test scenarios is represented by a correspondence between any two of source code identifiers, test case identifiers, and test scenario identifiers which is pre-configured in advance, and wherein the first source code identifier, a first test case identifier related to the first test case, and a test scenario identifier corresponding to the first test case are extracted based on a required feature to be completed by the first source code, and the first test case and a test scenario corresponding to the first test case are used for binding with the test-version software;
   creating a test task corresponding to the test-version software according to the first test case;
   transferring the test task to the automated testing platform via an automated testing platform interface,
   determining, by the automated testing platform, a first test script corresponding to the first test case based on the test task;
   performing, by the automated testing platform, a functional test for the test-version software based on the first test script, to obtain the test result.

2. The method according to claim 1, further comprising:
   generating vulnerability information in respond to that the test result indicates that the test fails;
   obtaining a second source code based on the vulnerability information, wherein the second source code is compiled and deployed by the automated compilation and deployment platform, to obtain second deployment information of the second source code.

3. The method according to claim 1,
wherein the compiling and deploying, by the automated compilation and deployment platform, the first source code to obtain first deployment information of the first source code includes:
compiling, by the automated compilation and deployment platform, the first source code to obtain a first executable code;
deploying, by the automated compilation and deployment platform, the first executable code to a testing device to obtain the first deployment information.

4. The method according to claim 1, further comprising:
recording a testing process data;
generating a testing process statistical report based on the testing process data,
wherein the testing process data includes at least one of test result data, vulnerability information data, and test case usage data.

5. A software testing apparatus, comprising one or more memories and one or more processors, wherein the one or more memories has computer-readable codes stored therein, and when the computer-readable codes are executed by the processor, cause the software testing apparatus to implement as an automated compilation and deployment platform, an automated software testing management system and an automated testing platform, the automated software testing management system being configured with an automated compilation and deployment platform interface and an automated testing platform interface, the automated software testing management system calling and exchanging data with the automated compilation and deployment platform via the automated compilation and deployment platform interface, the automated software testing management system calling and exchanging data with the automated testing platform via the automated testing platform interface, wherein
the automated compilation and deployment platform is configured to obtain a first source code of a software to be tested and first code information corresponding to the first source code, compile the first source code to obtain a first executable code, and deploy the first executable code to a testing device via the automated compilation and deployment interface to obtain first deployment information of the first source code;
the automated software testing management system is configured to determine a first test case corresponding to the first code information according to a preset correspondence between code information and test cases, obtain a test-version software of the first source code according to the first deployment information, create a test task corresponding to the test-version software according to the first test case; and transfer the test task to the automated testing platform via the automated testing platform interface, wherein source codes, test cases, and test scenarios are developed and created based on required features, a correspondence between any two of source codes, test cases, and test scenarios is represented by a correspondence between any two of source code identifiers, test case identifiers, and test scenario identifiers which is pre-configured in advance, and wherein the first source code identifier, a first test case identifier related to the first test case, and a test scenario identifier corresponding to the first test case are extracted based on a required feature to be completed by the first source code, and the first test case and a test scenario corresponding to the first test case are bound with the test-version software;
the automated testing platform is configured to determine a first test script corresponding to the first test case based on the test task; perform a functional test for the test-version software based on the first test script to obtain the test result.

6. The apparatus according to claim 5, wherein the automated software testing management system is further configured to:
receive the test result from the automated testing platform via the automated testing platform interface;
generate vulnerability information in response to that the test result indicates that the test fails;
obtain a second source code based on the vulnerability information,
the automated compilation and deployment platform is further configured to compile and deploy the second source code;
the automated software testing management system is configured to determine a second test case corresponding to the second code information according to the preset correspondence between code information and test cases, and obtain a test-version software of the second source code according to the second deployment information.

7. The apparatus according to claim 6,
wherein the automated software testing management system is further configured to:
receive a testing process data;
generate a testing process statistical report based on the testing process data,
wherein the testing process data includes at least one of test result data, vulnerability information data, and test case usage data.

8. A device for software testing, comprising:
a processor; and
a memory,
wherein the memory has a computer-readable code stored therein, and when the computer-readable code is executed by the processor, the software testing method of claim 1 is executed.

* * * * *